United States Patent
Manukonda

(10) Patent No.: US 9,715,502 B1
(45) Date of Patent: Jul. 25, 2017

(54) DISTRIBUTED DATA MIGRATION USING CHUNKING

(71) Applicant: AMAZON TECHNOLOGIES, INC., Seattle, WA (US)

(72) Inventor: Manoj Chakravarthi Manukonda, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 14/668,211

(22) Filed: Mar. 25, 2015

(51) Int. Cl.
*G06F 17/30* (2006.01)

(52) U.S. Cl.
CPC .. *G06F 17/30079* (2013.01); *G06F 17/30194* (2013.01); *G06F 17/30474* (2013.01)

(58) Field of Classification Search
CPC ......... G06F 17/30079; G06F 17/30194; G06F 17/30474
USPC ........................................................ 707/827
See application file for complete search history.

(56) References Cited

U.S. PATENT DOCUMENTS

| | | | | |
|---|---|---|---|---|
| 6,247,109 B1 * | 6/2001 | Kleinsorge | ............... | G06F 9/461 711/153 |
| 7,739,233 B1 * | 6/2010 | Ghemawat | ........ | G06F 17/30215 707/610 |
| 8,185,497 B2 * | 5/2012 | Vermeulen | ........ | G06F 17/30212 707/626 |
| 8,589,574 B1 * | 11/2013 | Cormie | ............. | G06F 17/30094 709/230 |
| 9,454,537 B2 * | 9/2016 | Prahlad | .................. | G06F 17/302 |
| 2006/0136691 A1 * | 6/2006 | Brown | ..................... | G06F 3/061 711/165 |
| 2011/0213994 A1 * | 9/2011 | Thereska | ............... | G06F 1/3221 713/320 |
| 2013/0212165 A1 * | 8/2013 | Vermeulen | ........ | G06F 17/30212 709/203 |
| 2015/0012495 A1 * | 1/2015 | Prahlad | ................. | G06F 17/302 707/640 |

OTHER PUBLICATIONS

Ovsiannikov, Michael, et al., "The Quantcast File System", Proc. Of the VLDB Endowment, vol. 6, No. 11, © 1101. 2013, pp. 1092-1101.*

* cited by examiner

*Primary Examiner* — Robert Stevens
(74) *Attorney, Agent, or Firm* — Lindauer Law, PLLC

(57) ABSTRACT

Techniques are described for migrating data from source storage to destination storage using a chunking technique. The data to be migrated may be divided into a number of chunks according to a factor that is the number of migration modules to be employed in migrating the data. The chunks may be stored on intermediate storage and migrated from the intermediate storage to the destination storage by the migration modules executing in parallel. Because the number of chunks is based on a factor that is the number of migration modules, the utilization of the migration modules may be substantially equivalent during the migration process. The chunks are generated with a size to optimize input/output operations and prevent timeouts during read operations.

20 Claims, 8 Drawing Sheets

DISTRIBUTED DATA MIGRATION USING CHUNKING

BACKGROUND

A business, government entity, or other organization may process and store large amounts of data associated with transactions, users, customers, products, services, vendors, finances, or operations generally. In some cases, an organization may move data from one storage device to another to make the data available in a different format or expose the data to additional users or processes. An organization may also back up or otherwise copy the data to a redundant storage device, or recover the data from a backup copy. In such situations, an organization may seek ways to migrate data quickly while maintaining data integrity.

Certain implementations and embodiments will now be described more fully below with reference to the accompanying figures in which various aspects are shown. Aspects may be implemented in many different forms and should not be construed as limited to the implementations set forth herein. Like numbers refer to like elements throughout this disclosure.

DETAILED DESCRIPTION

This disclosure describes implementations of systems, devices, methods, and computer-readable media for migrating data in multiple chunks using multiple migration processes. In some implementations, data may be migrated from a source data storage system to a destination data storage system via an intermediate data storage system. Data stored on the source data storage system may be divided into multiple data chunks and stored on the intermediate data storage system. The data chunks may be of the same size or approximately the same size. Multiple migration processes may execute, at least partly in parallel, to copy the data chunks from the intermediate data storage system to the destination data storage system. In other implementations, other file operations may be used, such as a move of the data chunks to or from the intermediate data storage system. In some implementations, the number of data chunks may be a multiple of the number of migration processes to be employed to copy the data chunks from the intermediate data storage system to the destination data storage system. The size of the data chunks may be determined to optimize input/output (I/O) operations or mitigate the possibility of timeouts during attempted reads, as described further below.

Traditional data migration systems may divide data into an arbitrary number of data chunks having an arbitrary size. In such traditional systems, multiple migration processes may not be efficiently used given that certain processes may complete their copying before other processes. By dividing the data into a number of data chunks that is a multiple of the number of migration processes, implementations may ensure that the migration processes are loaded substantially equally. Such substantially equal loading of migration processes may provide for a faster and more efficient migration of the data compared to traditional migration systems in which certain processes may idle while other processes continue to copy data chunks.

Figure 1:
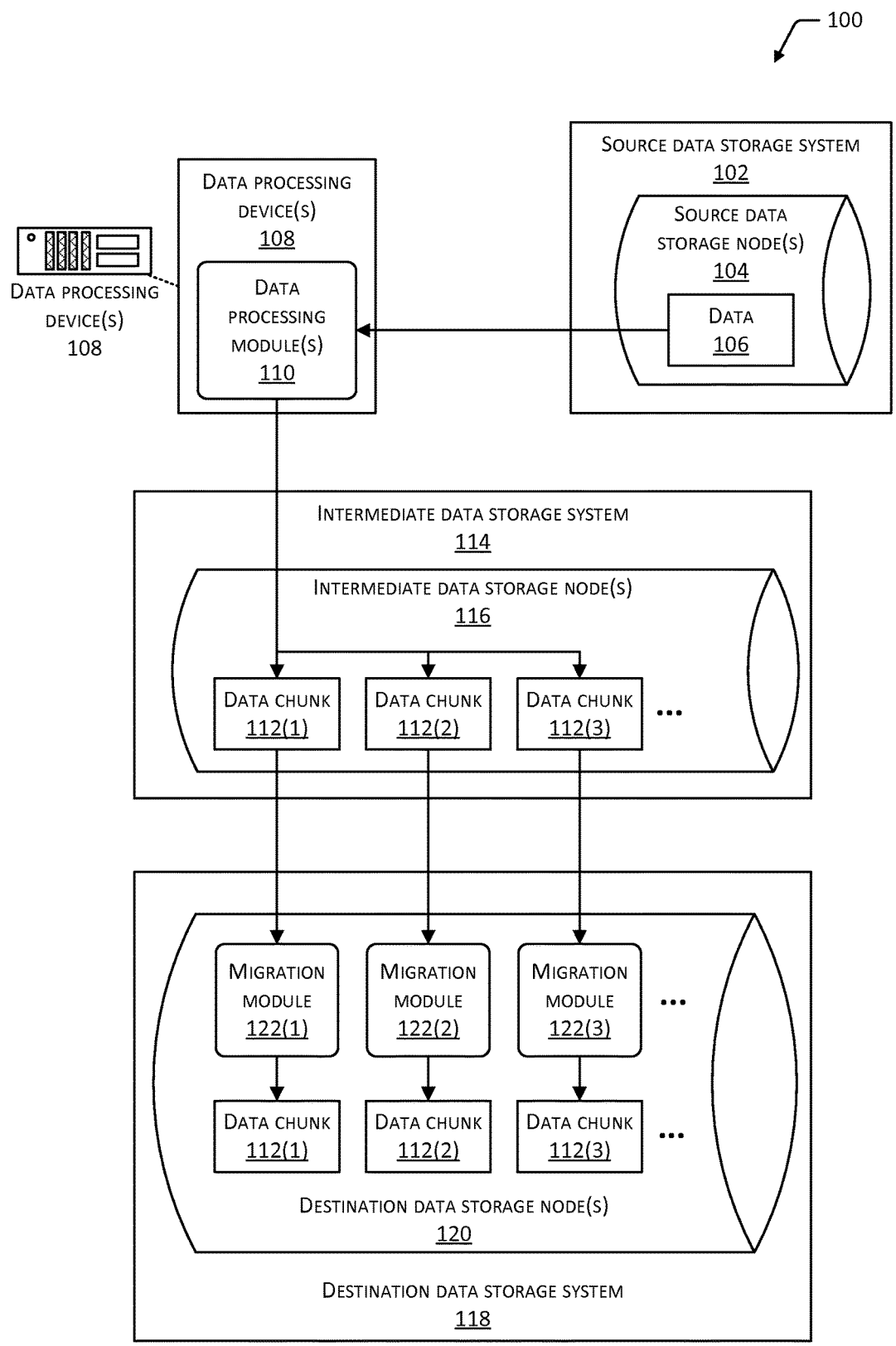
FIG. 1 depicts an environment for distributed data migration using chunking.

FIG. 1 depicts an environment 100 in which implementations may operate. As shown in FIG. 1, the environment 100 may include a source data storage system 102. The source data storage system 102 may include any number of source data storage nodes 104 on which data 106 is stored. The source data storage system 102 may be described as one or more clusters of source data storage nodes 104. A data storage node, such as the source data storage node(s) 104, may be a data storage device and may provide data storage in a datastore that is implemented as software, hardware, or a combination of hardware and software. The source data storage node 104 may store any amount of structured or unstructured data. In some cases, the source data storage node 104 may include one or more processors or computing devices to perform actions for data storage, retrieval, and modification. Alternatively, the source data storage node 104 may be controlled by processors or computing devices that are external to the source data storage node 104. The data 106 may include any amount of information of any type that is stored in one or more particular formats, or in an unformatted arrangement.

The source data storage node 104 may include any number of relational databases. A relational database may employ a relational storage format including one or more formally described tables, with each table including one or more columns associated with data attributes. The relational database may be managed through any type of Relational Database Management System (RDBMS) software. The source data storage node 104 may also include any number of non-relational datastores that employ a non-relational data storage format that may not comply with a relational database model. In some cases, the non-relational datastore(s) may employ a hierarchical database model or a network database model. The non-relational datastore(s) may also include key-value stores, hash tables, flat files, associative arrays, other types of data structures, correlation databases, or unstructured data storage. The source data storage node 104 may store data 106 using a row-oriented database or a column-oriented database.

The source data storage node 104 may include any number of datastores managed through any version of one or more of the following: Oracle™ and MySQL™, from Oracle Corporation of Redwood City, Calif., United States; DB2™, from International Business Machines (IBM) Corporation of Armonk, N.Y., United States; Linter™, from RELEX Group of Voronezh, Russia; FoxPro™ database management system, Microsoft Access™, or Microsoft SQL Server™, from Microsoft Corporation of Redmond, Wash., United States; PostgreSQL™, from the PostgreSQL Global Development Group; SQLite™, from D. Richard Hipp; ParAccel™ Analytic Database from Actian of Redwood City, Calif., United States; or Hadoop™, from the Apache Software Foundation.

The environment 100 may include one or more data processing devices 108. The data processing device(s) 108 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an electronic book (e-book) reader, an automotive computer, a desktop computer, a laptop computer, a game console, a home entertainment device, and so forth. Although examples herein may describe the data processing device(s) 108 as physical device(s), implementations are not so limited. In some cases, the data processing device(s) 108 may include one or more of a virtual computing environment, a hypervisor, an emulation, or a virtual machine executing on one or more physical computing devices. In some cases, two or more of the data processing devices 108 may comprise a cluster, cloud, farm, or other grouping of multiple devices that coordinate operations to provide load balancing, failover support, parallel processing capabilities, shared storage resources, or other aspects. The data processing device(s) 108 are described further with reference to FIG. 4.

The data processing device(s) 108 may execute one or more data processing modules 110. The data processing module(s) 110 may access the data 106 stored on the source data storage system 102 and process the data 106 to generate data chunks 112. The data processing module(s) 110 may store the data chunks 112 on an intermediate data storage system 114. The intermediate data storage system 114 may include any number of intermediate data storage nodes 116 as described above. The intermediate data storage system 114 may be described as one or more clusters of intermediate data storage nodes 116.

The environment 100 may also include a destination data storage system 118 that includes any number of destination data storage nodes 120 as described above. The destination data storage node(s) 120 are described further with reference to FIG. 5. The destination data storage system 118 may be described as one or more clusters of destination data storage nodes 120. The destination data storage node(s) 120 may each execute one or more migration modules 122. A migration module 122 may be a process, application, thread, library, script, or other software that executes to copy one or more data chunks 112 to the destination data storage node(s) 120. For example, the migration module 122 may use a "get" or "put" operation to perform the copy. The migration modules 122 may execute to complete the process of migrating the data 106 from the source data storage system 102 to the destination data storage system 118.

In some implementations, the data 106 may be stored on the source data storage system 102 in a compressed format. In such cases, the data chunks 112 may also be compressed. In some implementations, the data 106 may be stored on the source data storage system 102 in an uncompressed format and the data chunks 112 may be compressed prior to being stored on the intermediate data storage system 114. Alternatively, the data chunks 112 may be stored on the intermediate data storage system 114 in an uncompressed format and may be compressed prior to being stored on the destination data storage system 118. In some implementations, the data chunks 112 may be stored in an uncompressed format on the destination data storage system 118. Implementations support the use of any compression algorithm for compression of one or more of the data 106 or the data chunks 112. In some implementations, the data chunks 112 may be stored on the intermediate data storage system 114 using a storage format that is supported by the destination data storage system 118.

In some implementations, a portion of data 106 to be migrated may be divided into a number of data chunks 112 according to a factor that is based at least in part on the number of migration modules 122 to be employed in copying the data from the intermediate data storage system 114 to the destination data storage system 118. The number of data chunks 112 may be a multiple of the number of migration modules 122. For example, in cases where 16 migration modules 122 are to be employed, the number of data chunks 112 may be N×16 (e.g., 16, 32, 48, 64, etc.) where N is any integer. In some cases, the number of data chunks 112 may be a power of the number of migration modules 122. For example, in cases where 16 migration modules 122 are to be employed, the number of data chunks 112 may be 16^N (e.g., 16, 256, 4096, etc.) where N is any integer. The division of the data 106 into the data chunks 112 is described further with reference to FIGS. 2, 3, 6, and 7. The copying of the data chunks 112 from the intermediate data storage system 114 to the destination data storage system 118 is described further with reference to FIG. 8.

In some implementations, the destination data storage system 118 may be included in the Amazon Redshift® data warehouse solution provided by Amazon.com of Seattle, Wash., United States. Redshift® may be based at least partly on a massive parallel processing (MPP) data warehouse such as ParAccel® as promulgated by ParAccel, Inc. of California. In some implementations, the intermediate data storage system 114 may be included in the Amazon Simple Storage Service (S3)™ provided by Amazon.com. In some implementations, S3™ may manage data using an object storage architecture in which data is managed as objects. Such objects may be accessed via interfaces based on a Representational State Transfer (REST) architecture, Simple Object Access Protocol (SOAP), web services, and so forth.

In an example implementation, the destination data storage system 118 included 300 clusters of 100 destination data storage nodes 120 per cluster. Each destination data storage node 120 included 16 processors available to execute migration modules 122, such that each cluster supported 1600 processors.

On failure of a particular destination data storage node 120, or failure of a migration module 122, the destination data storage system 118 may provide failover support such that other destination data storage nodes 120 or migration modules 122 may take over the interrupted copying of data chunks 112. If the destination data storage system 118 experiences a systemic failure of a large number of destination data storage nodes 120 or migration modules 122, the migration of the data 106 may restart from its initial state or from a previously stored earlier state.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. In some implementations, the communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Although FIG. 1 depicts the source data storage system 102, the data processing device(s) 108, the intermediate data storage system 114, and the destination data storage system 118 as separate entities, implementations are not so limited. In some implementations, any of these entities may be incorporated into a same set of one or more devices. For example, the intermediate data storage system 114 and the destination data storage system 118 may be part of a same data storage system. In some cases, the source data storage system 102 and the intermediate data storage system 114 may be part of a same data storage system. In some implementations, the data processing module(s) 110 may execute on one or more of the source data storage node(s) 104, the intermediate data storage node(s) 116, or the destination data storage node(s) 120. Moreover, although FIG. 1 may depict the migration modules 122 as executing on the destination data storage node(s) 120, in some implementations the migration modules 122 may execute on other devices such as the data processing device(s) 108.

Figure 2:
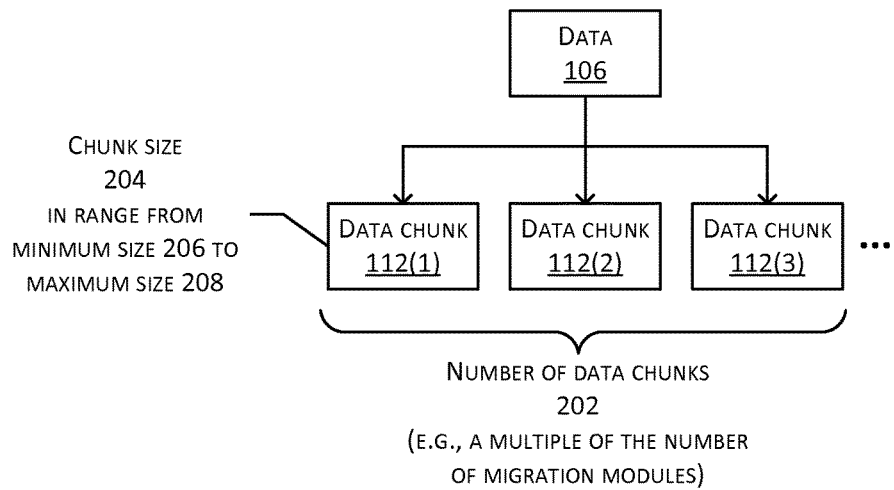
FIG. 2 depicts an example of dividing data into chunks for migration.

FIG. 2 depicts an example 200 of dividing the data 106 into data chunks 112 for migration. As shown in FIG. 2, the data 106 may be divided into a number of data chunks 202 that is a multiple of the number of migration modules 122 to be employed in copying the data chunks 112. In some implementations, the number of data chunks 202 may be determined as the smallest number of data chunks 202 such that a chunk size 204 of the data chunks 112 is in a predetermined size range. The size range may be from a minimum size 206 to a maximum size 208.

In some implementations, the minimum size 206 may be determined to optimize I/O operations, such as operations to read or write the data chunks 112 on the intermediate data storage system 114. For example, a smaller minimum size 206 may lead to a larger number of data chunks 202 and thus a larger number of connections to the intermediate data storage system 114. The larger number of connections may add latency to the migration process, given the additional time to establish or break down the larger number of network connections to the intermediate data storage system 114. Optimization may include a set of conditions or situation in which the processing of the I/O operations is at a peak value. For example, when in an optimized condition, the number of I/O operations handled per unit time may be at their highest level possible. Optimization of the I/O operations may include, but is not limited to, maximizing transfer rate, minimizing reconnections, minimizing connection timeouts, and so forth. In some implementations optimization may approach, but not reach, an idealized or theoretically optimal condition.

In some implementations, the maximum size 208 may be determined to prevent, or mitigate (e.g., reduce), the probability of timeouts occurring during attempted reads of data chunks 112 from the intermediate data storage system 114. For example, a larger maximum size 208 may lead to a higher rate of timeouts as the processor(s) executing the migration modules 122 attempt to read and copy the larger data chunks 112. Accordingly, the maximum size 208 may be based, at least in part, on the capabilities of the processor(s) executing the migration modules 122, such as processor speed, available memory (e.g., Random Access Memory (RAM)), networking capabilities, or other characteristics of the processor(s). For example, higher capability processor(s) with more memory, higher speeds, greater computational capacity, larger onboard caches, particular instruction sets, and so forth may be able to support reads of larger data chunks 112 without timing out. In implementations where the migration modules 122 execute on the destination data storage node(s) 120, the speed, memory, or other characteristics of the processor(s) of the destination data storage node(s) 120 may be analyzed to determine the maximum size 208.

After the minimum size 206 and the maximum size 208 have been determined, the data processing module(s) 110 may determine the number of data chunks 202 such that: the chunk size 204 is included in the range from the minimum size 206 to the maximum size 208; and the number of data chunks 202 is a multiple (or power) of the number of migration modules 122. For example, the minimum size 206 may be determined as 1 megabyte (MB) and the maximum size 208 may be determined as 800 MB. If the data 106 to be migrated has a size of 500 gigabytes (GB), and the number of migration modules 122 is 256, then the number of data chunks 202 may be determined as 3×256=768 with a chunk size 204 of approximately 651 MB. The number of data chunks 202 may be determined as the minimum number of data chunks 202 that satisfies two criteria: the number of data chunks 202 is an integer multiple of the number of migration modules 122; and the chunk size 204 is included in the range from the minimum size 206 to the maximum size 208.

Example Code 1, below, lists example code (or pseudocode) for such a chunking algorithm to generate the data chunks 112. In Example Code 1, the parameter indicates a number of migration modules 122 (referred to elsewhere herein as the factor) and the maximum size 208 is 1 GB.

Example Code 1

```
parameter=100; /*may be defined as system/profile/job
   level parameter*/for (iteration=1, iteration>0,
   iteration=iteration+1)/*looping over iteration incre-
   ment*/{
   if   ((total_input_file_size/(parameter*iteration))<1
      GB)/*checking if chunk size<1 GB*/{
      size_of_chunk=(total_input_file_size/
         (parameter*iteration)
      /*Perform operations to split the file into data chunks
         of chunk size, and upload to intermediate data
         storage*/
      Break; /*exit the loop*/
}}
```

Figure 3:
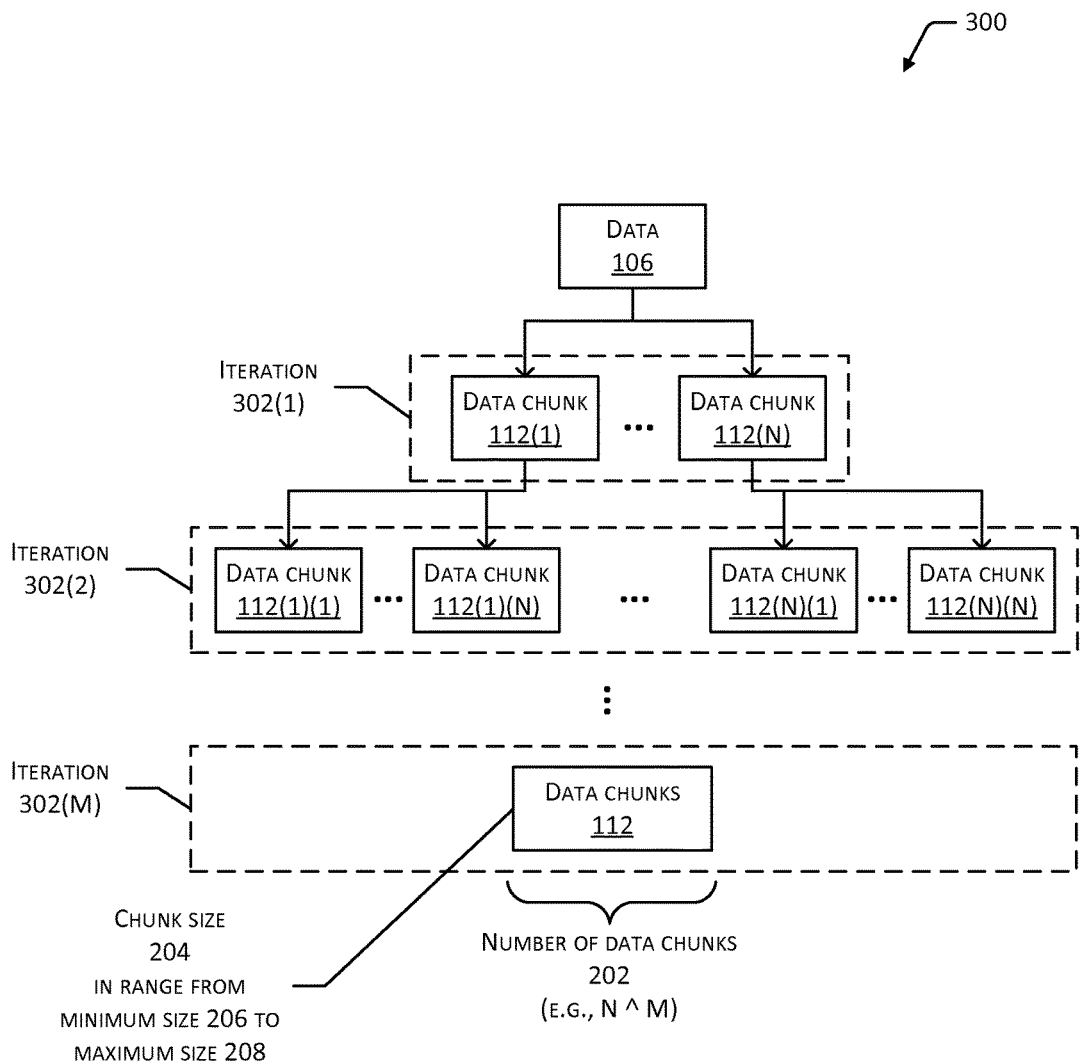
FIG. 3 depicts an example of iteratively dividing data into chunks for migration.

The above example describes implementations in which the number of data chunks 202 is a multiplicative factor of the number of migration modules 122. FIG. 3 depicts an example 300 of iteratively dividing the data 106 into the data chunks 112 for migration, such that the number of data chunks 202 is an exponential factor of the number of migration modules 122. In the example of FIG. 3, the data 106 is divided into data chunks 112 during one or more iterations 302. During each iteration, 302, the data 106 (or each data chunk 112) is divided into N data chunks 112, where N is the number of migration modules 122. For example, during a first iteration 302(1), the data 106 may be divided into N data chunks 112. During a second iteration 302(2), each of the data chunks 112 may be further divided into N smaller data chunks 112, such that the number of data chunks 112 is N^2. The process may continue in this manner until the chunk size 204 is included in the range from the minimum size 206 to the maximum size 208. Accordingly, the final number of data chunks 112 may be N^M (N raised to the Mth power), where M is the number of iterations 302 performed.

The number of iterations 302 may be the minimum number of iterations 302 to reach a chunk size 204 in the range from the minimum size 206 to the maximum size 208. For example, the minimum size 206 may be determined as 2 MB and the maximum size 208 may be determined as 1 GB. If the data 106 to be migrated has a size of 500 GB, and the number of migration modules 122 is five, the first iteration 302(1) may generate five data chunks 112 of a chunk size 204 of 100 GB. The second iteration 302(2) may generate 25 data chunks 112 of a chunk size 204 of 20 GB. The third iteration 302(3) may generate 125 data chunks 112 of a chunk size 204 of 4 GB. The fourth iteration 302(4) may generate 625 data chunks 112 of a chunk size 204 of 800 MB. Because 800 MB is within the target chunk size range, the process may not perform any additional iterations 302. The 625 data chunks 112 may be generated and stored on the intermediate data storage system 114. The process may generate data chunks 112 that are equal or substantially equal in chunk size 204. The similar chunk size 204 may enable the migration load to be evenly distributed across the various migration modules 122 in cases where the processor(s) executing the migration modules 122 have similar speeds or other characteristics.

Example Code 2, below, lists example code (or pseudocode) for such an iterative chunking algorithm to generate the data chunks 112. In Example Code 2, the parameter indicates a number of migration modules 122 and the maximum size 208 is 1 GB.

Example Code 2

```
parameter=100; /*may be defined as system/profile/job
    level parameter*/for (iteration=1, iteration>0,
    iteration=iteration+1) /*looping over iteration increment*/{
    if ((total_input_file_size/(parameter^iteration))<1 GB)/
        *checking if chunk size<1 GB*/{
        size_of_chunk=(total_input_file_size/(parameter^iteration)
        /*Perform operations to split the file into data chunks
            of chunk size, and upload to intermediate data
            storage*/
        Break; /*exit the loop*/
    }}
```

Although examples herein describe an algorithm in which the number of migration modules 122 is employed as a factor (e.g., multiplicative or exponential) in dividing the data 106 into data chunks 112, implementations are not so limited. In some implementations, the number of processors of the migration modules 122 or the number of processor cores may be employed as the factor. In such cases, each processor or each processor core may execute a single migration module 122 or a same (or similar) number of migration modules 122.

Figure 4:
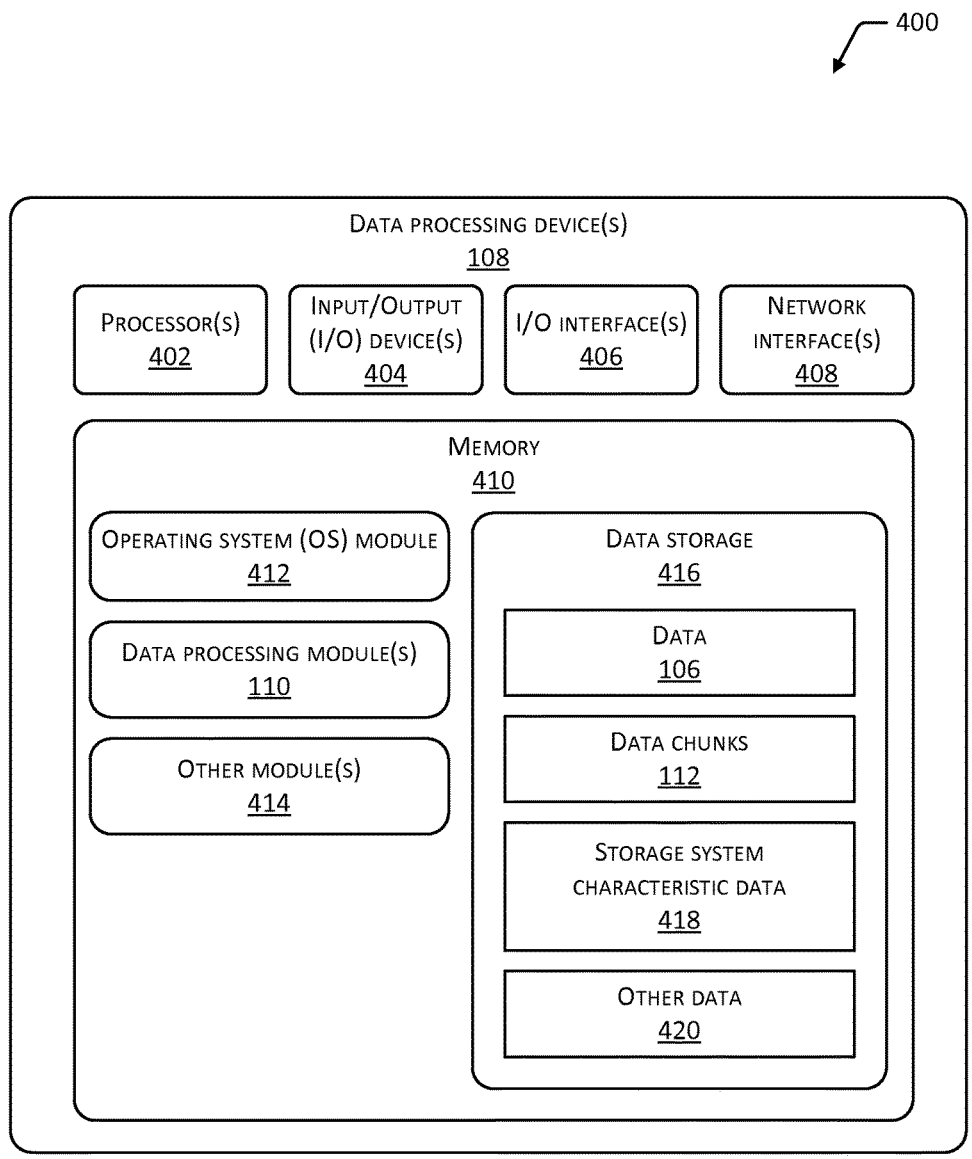
FIG. 4 depicts a block diagram of an example of data processing device(s) configured to perform data chunking operations.

FIG. 4 depicts a block diagram 400 of an example of the data processing device(s) 108. As shown in the block diagram 400, the data processing device(s) 108 may include one or more processors 402 configured to execute one or more stored instructions. The instructions may be stored as one or more software modules. The processor(s) 402 may include hardware-based processor(s) 402. The processor(s) 402 may comprise one or more cores.

The data processing device(s) 108 may include one or more I/O devices 404. The I/O device(s) 404 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include one or more output devices such as a display, an audio output device (e.g., a speaker), a printer, a haptic output device, and so forth. The I/O device(s) 404 may be physically incorporated with the data processing device(s) 108 or may be externally placed.

The data processing device(s) 108 may include one or more I/O interfaces 406 to enable components or modules of the data processing device(s) 108 to control, interface with, or otherwise communicate with the I/O device(s) 404. The I/O interface(s) 406 may enable information to be transferred in or out of the data processing device(s) 108, or between components of the data processing device(s) 108 through serial communication, parallel communication, or other types of communication. For example, the I/O interface(s) 406 may comply with a version of the RS-232 standard for serial ports or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The data processing device(s) 108 may also include one or more busses or other internal communications hardware or software that enables the transfer of data between the various modules and components of the data processing device(s) 108.

The data processing device(s) 108 may include one or more network interfaces 408 that enable communications between the data processing device(s) 108 and other network accessible computing devices, such as the source data storage nodes 104 included in the source data storage system 102, the intermediate data storage system 114, or the destination data storage system 118. The network interface(s) 408 may include one or more network interface controllers (NICs) or other types of transceiver devices configured to send and receive communications over one or more networks.

The data processing device(s) 108 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions describing data structures, program modules, processes, applications, or other data for the operation of the data processing device(s) 108. In some implementations, the memory 410 may provide storage of computer-readable instructions or other information in a non-transitory format. The memory 410 may comprise a computer-readable storage device that is incorporated into the data processing device(s) 108 or external to the data processing device(s) 108.

The memory 410 may include an operating system (OS) module 412. The OS module 412 may be configured to manage hardware resources such as the I/O device(s) 404, the I/O interface(s) 406, and the network interface(s) 408. The OS module 412 may also be configured to provide various services to applications, processes, or modules executed by the processor(s) 402. The OS module 412 may include one or more of the following: any version of the Linux® OS; any version of iOS™ or OS X® from Apple Corp. of Cupertino, Calif., USA; any version of Windows® or Windows Mobile™ from Microsoft Corp. of Redmond, Wash., USA; any version of Android® from Google Corp. of Mountain View, Calif., USA and its derivatives from various sources; any version of Palm OS® from Palm Computing, Inc. of Sunnyvale, Calif., USA and its derivatives from various sources; any version of BlackBerry OS™ from Research In Motion Ltd. of Waterloo, Ontario, Canada; any version of VxWorks® from Wind River Systems of Alameda, Calif., USA; or other operating systems.

The memory 410 may include one or more of the modules described above as executing on the data processing device(s) 108, such as the data processing module(s) 110. The memory 410 may also include one or more other modules 414, such as a user authentication module or an access control module to secure access to the data processing device(s) 108, a cryptographic module to secure communications to and from the data processing device(s) 108, and so forth.

The memory 410 may include, or have access to, data storage 416 which stores data for operations of the data processing device(s) 108. The data storage 416 may comprise a file system, database, array, structured list, tree, or other data structure, and may be a relational or a non-relational datastore. The data storage 416 may store any of the information described above as being present on, or accessed by, the data processing device(s) 108, such as one or more of the data 106 or the data chunks 112. In some cases, the data storage 416 may also store storage system characteristic data 418. The storage system characteristic data 418 may describe one or more characteristics of one or more of the storage systems described herein. For example, the storage system characteristic data 418 may describe the processing capabilities of the destination data storage node(s) 120, such as the processor speed, memory available (e.g., RAM), networking capabilities, and so forth. The storage system characteristic data 418 may be employed to determine one or both of the minimum size 206 or the maximum size 208 of the data chunks 112.

The data storage 416 may also store other data 420, such as user authentication information, access control data, or other information. In some implementations, at least a portion of the information stored in the data storage 416 may be stored externally to the data processing device(s) 108 on other devices that may communicate with the data processing device(s) 108 via the I/O interface(s) 406 or the network interface(s) 408.

Figure 5:
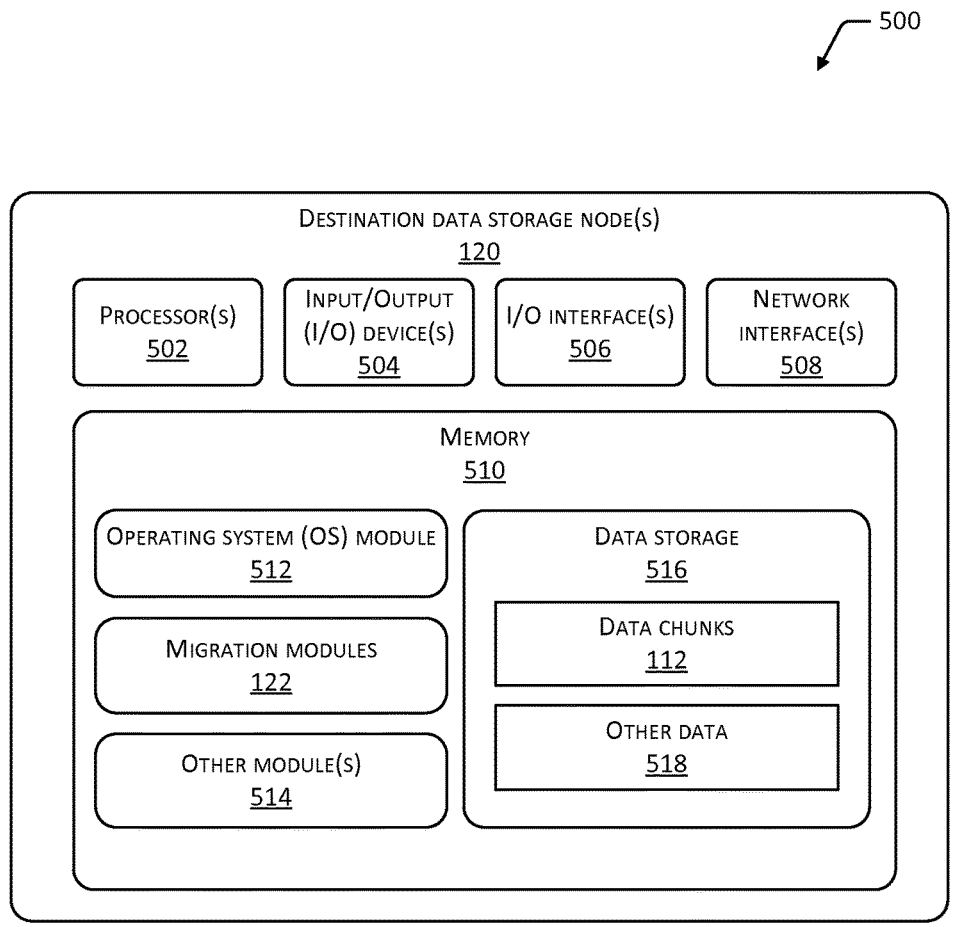
FIG. 5 depicts a block diagram of an example of destination data storage device(s) on which chunked data may be stored.

FIG. 5 depicts a block diagram 500 of an example of the destination data storage node(s) 120. As shown in the block diagram 500, the destination data storage node(s) 120 may include one or more processors 502 (e.g., hardware-based processor(s)) configured to execute one or more stored instructions. The instructions may be stored as one or more software modules. The processor(s) 502 may comprise one or more cores. The destination data storage node(s) 120 may include one or more I/O devices 504, one or more I/O interfaces 506, and one or more network interfaces 508 as described above respectively with reference to the I/O device(s) 404, the I/O interface(s) 406, and the network interface(s) 408.

The destination data storage node(s) 120 may include one or more memories, described herein as memory 510. The memory 510 comprises one or more CRSM, as described above with reference to the memory 410. The memory 510 may include an OS module 512 that is configured to manage resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412.

The memory 510 may include one or more of the modules described above as executing on the destination data storage node(s) 120, such as the migration modules 122. The memory 510 may also include one or more other modules 514, such as a user authentication module or an access control module to secure access to the destination data storage node(s) 120, a cryptographic module to secure communications to and from the destination data storage node(s) 120, and so forth.

The memory 510 may include data storage 516, which may store data for operations of the destination data storage node(s) 120. The data storage 516 may comprise a database, array, structured list, tree, or other data structure, and may be a relational or a non-relational datastore. The data storage 516 may store data such as that described above as present on the destination data storage node(s) 120, including the data chunks 112. The data storage 516 may also store other data 518, such as user authentication information or access control data. In some implementations, at least a portion of the information stored in the data storage 516 may be stored externally to the destination data storage node(s) 120 on other devices that may communicate with the destination data storage node(s) 120 via the I/O interface(s) 506 or via the network interface(s) 508.

Figure 6:
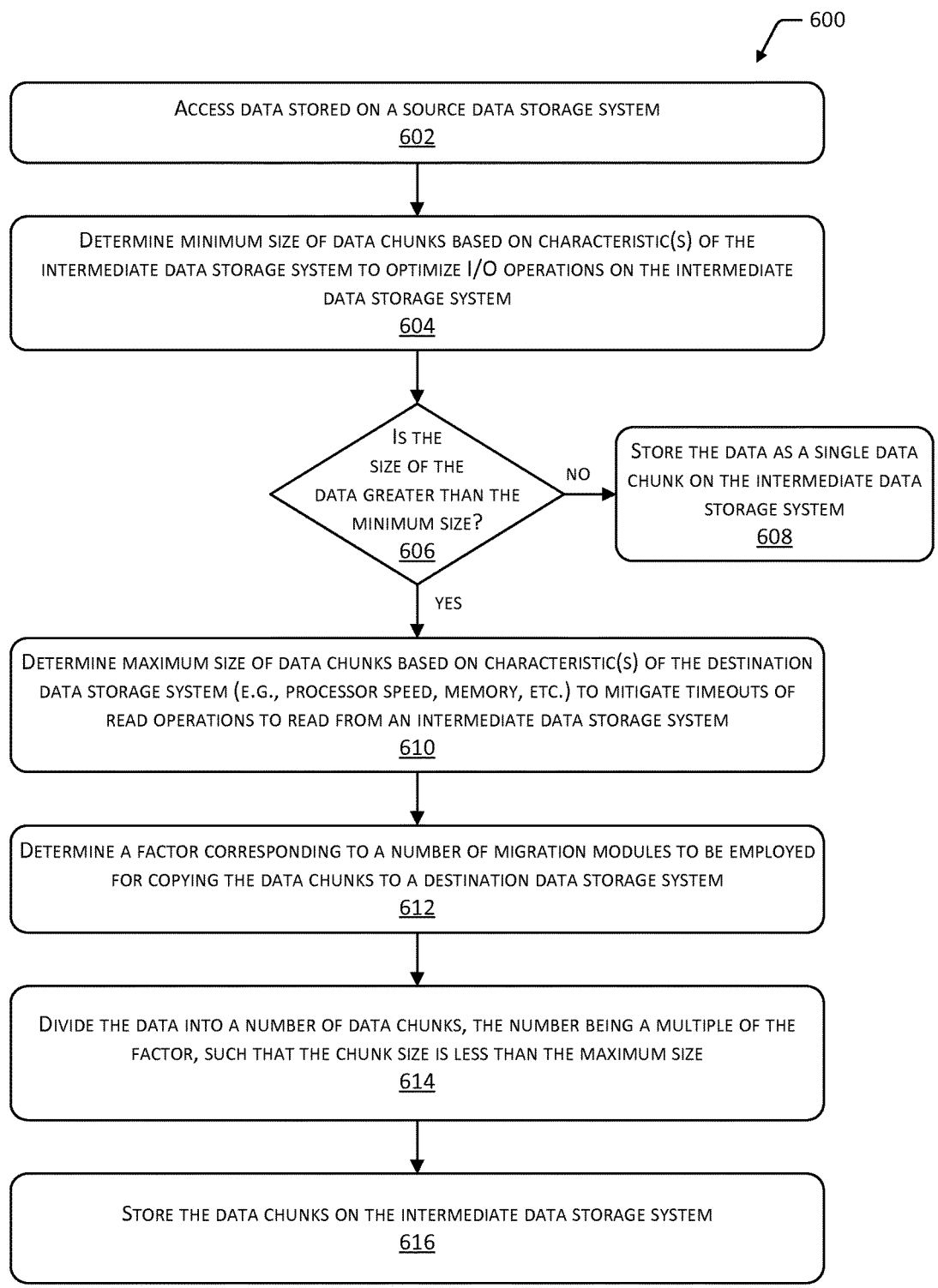
FIG. 6 depicts a flow diagram of the process for dividing data into chunks to be migrated to a destination data storage system.

FIG. 6 depicts a flow diagram 600 of the process for dividing the data 106 into data chunks 112 to be migrated to a destination data storage system 118. Operations of the process may be performed by one or more of the data processing module(s) 110, the other module(s) 414 executing on the data processing device(s) 108, or other modules executing on other device(s).

At 602, the data 106 to be migrated may be accessed. The data 106 may be stored on the source data storage system 102 or elsewhere.

At 604, a minimum size 206 of the data chunks 112 may be determined. As described above with reference to FIG. 2, the minimum size 206 may be determined based on characteristics of the intermediate data storage system 114 to optimize I/O operations on the intermediate data storage system 114. The optimization of the I/O operations may include reducing timeouts of connections used to transfer data, minimizing delays associated with establishment of a connection, and so forth. For example, the optimization of the I/O operations may involve reducing or minimizing the number connections that timeout during data transfer.

At 606, a determination is made whether the total size of the data 106 is greater than the minimum size 206. If not, the process may proceed to 608 and the data 106 may be stored (e.g., as a single data chunk 112) on the intermediate data storage system 114. If it is determined at 606 that the total size of the data 106 is greater than the minimum size 206, the process may proceed to 610. In some implementations, the storage of the data chunks 112 on the intermediate data storage system 114 may include removing the original data 106 from the source data storage system 102 after the data chunks 112 have been successfully stored. Alternatively, data 106 may persist on the source data storage system 102.

At 610, the maximum size 208 of the data chunks 112 may be determined. As described above with reference to FIG. 2, the maximum size 208 may be based on characteristics of the destination data storage node(s) 120, such as processor speed, available memory, network communications capabilities, and so forth. The maximum size 208 may be determined to prevent or mitigate the possibility of timeouts occurring during attempted read operations to read the data chunks 112 from the intermediate data storage system 114.

At 612, a factor is determined corresponding to a number of migration modules 122 to be employed for copying the data chunks 112 from the intermediate data storage system 114 to the destination data storage system 118. Alternatively, the factor may be based on the number of processor(s) 502 of the destination data storage node(s) 120, the number of processor cores of the processor(s) 502, or the number of destination data storage node(s) 120. In some cases, the factor may be determined as an average, a mean, or a maximum number of one of the following: the number of migration modules 122, the number of processor(s) 502, or the number of processor cores of the processor(s) 502. In some cases, the factor may be determined manually.

At 614, the data 106 is divided into the data chunks 112. As described above with reference to FIG. 2, the number of data chunks 202 may be a multiple of the factor determined at 612 and may be determined such that the chunk size 204 is less than the maximum size 208.

At 616, the data chunks 112 may be stored on the intermediate data storage system 114. In some implementations, the data chunks 112 may be reformatted prior to storage, such that the data chunks 112 are stored according to a storage format supported by the destination data storage system 118. In other implementations, the data chunks 112 may be reformatted while stored at the intermediate data storage system 114, during transfer to the destination data storage system 118, and so forth.

Figure 7:
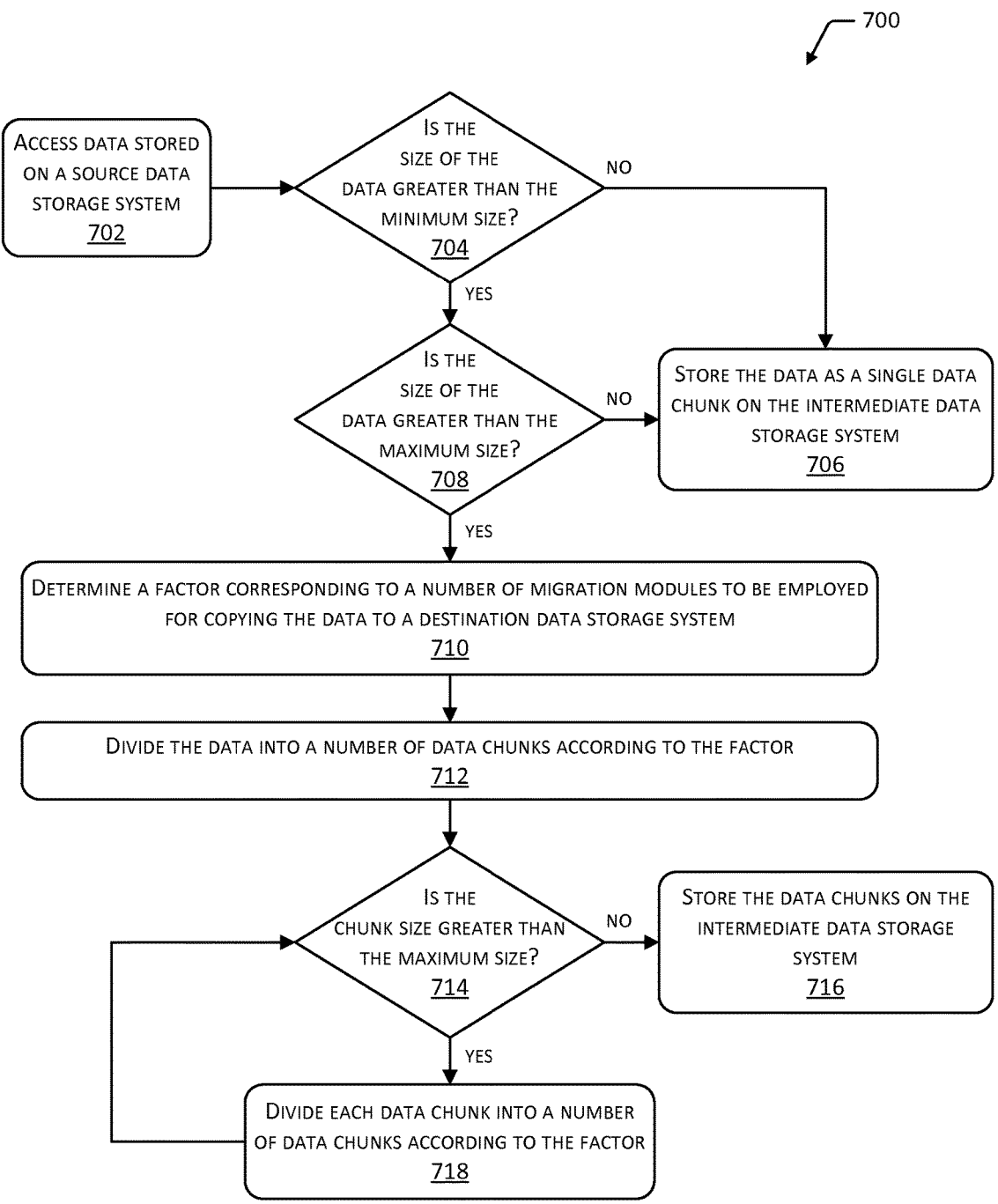
FIG. 7 depicts a flow diagram of a process for iteratively dividing data into chunks to be migrated to a destination data storage system.

FIG. 7 depicts a flow diagram 700 of a process for iteratively dividing the data 106 into data chunks 112 to be migrated to a destination data storage system 118. Operations of the process may be performed by one or more of the data processing module(s) 110, the other module(s) 414 executing on the data processing device(s) 108, or other modules executing on other device(s).

At 702, the data 106 may be accessed. As described above, the data 106 may be accessed from the source data storage system 102 or elsewhere.

At 704, a determination is made whether the size of the data 106 is greater than the minimum size 206. If not, the process may proceed to 706, and the data 106 may be stored (e.g., as a single data chunk 112) on the intermediate data storage system 114. If the size of the data 106 is greater than the minimum size 206, the process may proceed to 708.

At 708, a determination is made whether the size of the data 106 is greater than the maximum size 208. If not, the process may proceed to 706, and the data 106 may be stored (e.g., as a single data chunk 112) on the intermediate data storage system 114. If the size of the data 106 is greater than the maximum size 208, the process may proceed to 710. In some implementations, the process may omit the check at 704.

At 710, the factor is determined as described above with reference to 612.

At 712, the data 106 is divided to generate a first set of data chunks 112 according to the factor. For example, if the factor is three, three data chunks 112 may be generated at 712 with a chunk size 204 that is one-third, or approximately one-third, of the total size of the data 106.

At 714, a determination is made whether the chunk size 204 of the current set of data chunks 112 is greater than the maximum size 208. If the chunk size 204 is less than or equal to the maximum size 208, the process may proceed to 716. At 716, the current set of data chunks 112 may be stored on the intermediate data storage system 114.

If the chunk size 204 of the current set of data chunks 112 is greater than the maximum size 208, the process may proceed to 718. At 718, each data chunk 112 of the current set of data chunks 112 may be divided into a number of data chunks 112 according to the factor. For example, each of the three data chunks 112 in the current set of data chunks 112 may be divided into three smaller data chunks 112 to generate a next set of nine data chunks 112.

The process may then return to 714 and check whether the chunk size 204 of the current set of data chunks 112 is greater than the maximum size 208. In this way, the process may iterate until the chunk size 204 is less than the maximum size 208 or within the range from the minimum size 206 to the maximum size 208. The number of data chunks 202 in the final set of data chunks 112 may be the factor raised to a power that is the number of iterations 302, as described with reference to FIG. 3.

Figure 8:
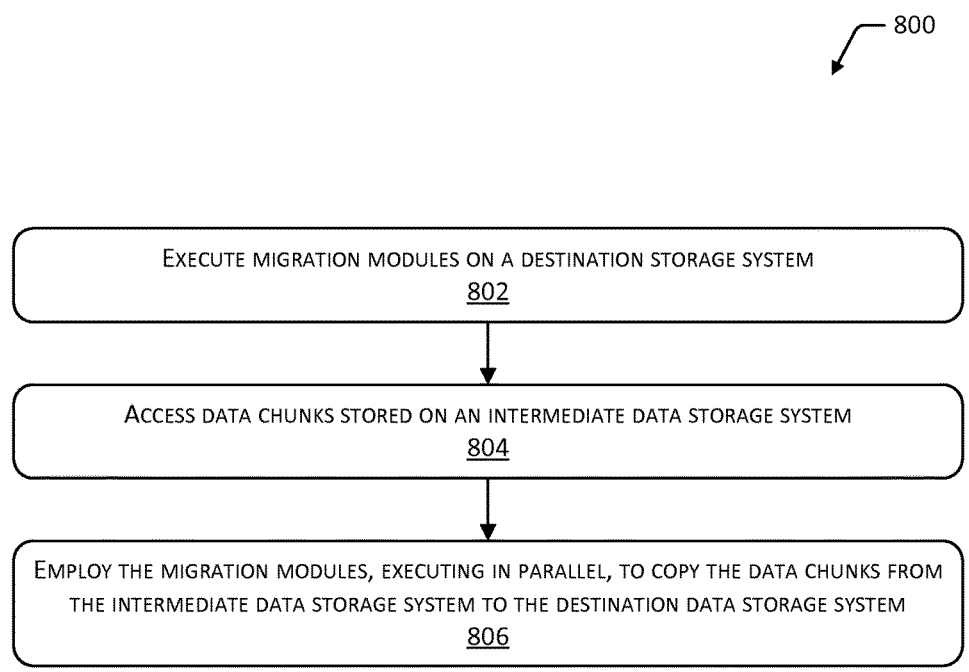
FIG. 8 depicts a flow diagram of a process for employing migration modules executing in parallel to copy chunks of data from an intermediate data storage system to a destination data storage system.

FIG. 8 depicts a flow diagram 800 of a process for employing migration modules 122 executing in parallel to copy data chunks 112 from an intermediate data storage system 114 to a destination data storage system 118. Operations of the process may be performed by one or more of the migration modules 122, the other module(s) 514 executing on the destination data storage node(s) 120, or other modules executing on other device(s).

At 802, the migration modules 122 may be executed on the destination data storage system 118, or elsewhere.

At 804, the data chunks 112 may be accessed on the intermediate data storage system 114. The data chunks 112 may have been previously generated and stored as described above.

At 806, the migration modules 122 may be employed to copy the data chunks 112 from the intermediate data storage system 114 to the destination data storage system 118. The migration modules 122 may execute in parallel. Parallel execution of the migration modules 122 may include different ones of the migration modules 122 executing, at least in part, contemporaneously to copy different ones of the data chunks 112. Because the number of data chunks 202 may be a multiple of the number of migration modules 122 executing, the migration modules 122 may handle a substantially similar amount of data chunks 112 and thus be similarly loaded and utilized. In some implementations, the copying of the data chunks 112 may include removing the data chunks 112 from the intermediate data storage system 114 after the copying has successfully completed. Alternatively, a copy of the data chunks 112 may persist on the intermediate data storage system 114.

In the above examples, the destination data storage nodes 120 executing the migration modules 122 may have similar characteristics and capabilities with regard to processing power, memory capacity, networking, and so forth. Accordingly, the data chunks 112 may be generated with a similar chunk size 204 to evenly load the similarly capable destination data storage nodes 120. Alternatively, the destination data storage nodes 120 may have different capabilities and may be grouped into set of nodes that have similar capabilities. For example, destination data storage nodes 120 with higher processing speeds may be included in a same group, and that group may be tasked with copying data chunks 112 that are larger than those copied by other nodes. Accordingly, in some implementations the chunk size 204 may vary to provide more efficient utilization of destination data storage nodes 120 of different capabilities.

The techniques described herein were tested in a test environment to measure the improvements in migration speed compared to traditional migration techniques. Using a traditional technique, a portion of data 106 was divided into an arbitrary number of 100,000 data chunks 112 of an arbitrary chunk size 204. This first set of data chunks 112 was loaded onto a destination data storage system 118 in 300 minutes. Using the chunking techniques described above, the same portion of data 106 was divided into approximately 16,000 data chunks 112, each having a more optimal chunk size 204 within the range from the minimum size 206 to the maximum size 208. This second set of data chunks 112 was loaded onto the destination data storage system 118 in 16 minutes. Accordingly, the techniques described herein provide for faster, more efficient data loads compared to traditional techniques.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether unmodulated or modulated using a carrier, may include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
   accessing data stored on a first data storage system;
   determining a factor corresponding to a number of migration processes to be employed for copying the data from a second data storage system to a third data storage system;
   iteratively dividing the data into data chunks, according to the factor, until a size of the data chunks is included in a size range from a minimum size to a maximum size, wherein:
      the minimum size is determined to optimize input/output operations on the second data storage system; and
      the maximum size is determined to prevent timeouts of read operations on the second data storage system;
   storing the data chunks on the second data storage system; and
   employing the migration processes executing in parallel to copy the data chunks from the second data storage system to the third data storage system.

2. The method of claim 1, wherein the factor further corresponds to a number of processors on which the migration processes execute in parallel.

3. The method of claim 1, wherein the data chunks are stored, on the second data storage system, in a storage format supported by the third data storage system.

4. The method of claim 1, wherein iteratively dividing the data into the data chunks further comprises:
   during a first iteration, dividing the data into a first number of first data chunks, the first number being the factor;
   determining that the size of the first data chunks is greater than the maximum size;
   during one or more second iterations, dividing individual ones of the first data chunks into a second number of second data chunks, the second number being the factor to a power that is a number of the one or more second iterations;
   determining that the size of the second data chunks is not greater than the maximum size; and
   designating the second data chunks as the data chunks to be stored on the second data storage system.

5. A system, comprising:
   at least one computing device configured to implement one or more services, the one or more services configured to:
      determine a factor corresponding to a number of migration modules to be employed for copying data chunks from an intermediate data storage system to a destination data storage system;
      access data stored on a source data storage system;
      divide the data into the data chunks, wherein a number of the data chunks is a multiple of the factor, and wherein a size of the data chunks is not greater than a maximum size;
      store the data chunks on the intermediate data storage system; and
      employ at least a portion of the migration modules in parallel to copy the data chunks from the intermediate data storage system to the destination data storage system.

6. The system of claim 5, wherein the one or more services are further configured to:

determine the maximum size to prevent timeouts of read operations on the intermediate data storage system.

7. The system of claim 5, wherein the size of the data chunks is at least a minimum size that is determined to optimize input/output operations on the intermediate data storage system.

8. The system of claim 7, wherein:
the minimum size is 1 megabyte; and
the maximum size is 800 megabytes.

9. The system of claim 5, wherein dividing the data into the data chunks further comprises iteratively dividing the data into the data chunks according to the factor, until a size of the data chunks is not greater than the maximum size.

10. The system of claim 9, wherein the number of the data chunks is the factor to a power that is a number of iterations performed to divide the data into the data chunks.

11. The system of claim 5, wherein:
the migration modules are executed on one or more processors; and
the maximum size is based on one or more of a speed or a memory capacity of the one or more processors.

12. The system of claim 11, wherein the one or more processors are incorporated into the destination data storage system.

13. The system of claim 5, wherein the data chunks are stored, on the intermediate data storage system, in a storage format supported by the destination data storage system.

14. The system of claim 5, wherein the factor further corresponds to a number of processors on which the migration modules execute in parallel.

15. One or more computer-readable media storing instructions which, when executed by at least one processor, instruct the at least one processor to:
determine a factor corresponding to a number of migration modules to be employed for copying data chunks from an intermediate data storage system to a destination data storage system;
access data to be stored on the destination data storage system;
generate the data chunks by iteratively dividing the data, according to the factor, until a size of the data chunks is not greater than a maximum size;
store the data chunks on the intermediate data storage system; and
employ at least a portion of the migration modules in parallel to copy the data chunks from the intermediate data storage system to the destination data storage system.

16. The one or more computer-readable media of claim 15, wherein generating the data chunks further comprises:
during a first iteration, dividing the data into a first number of first data chunks, the first number being the factor;
determining that the size of the first data chunks is greater than the maximum size;
during a second iteration, dividing individual ones of the first data chunks into a second number of second data chunks, the second number being the factor;
determining that the size of the second data chunks is not greater than the maximum size; and
designating the second data chunks as the data chunks to be stored on the intermediate data storage system.

17. The one or more computer-readable media of claim 15, wherein the data chunks are stored, on the intermediate data storage system, in a storage format supported by the destination data storage system.

18. The one or more computer-readable media of claim 15, wherein the data chunks are stored in a compressed format on the intermediate data storage system.

19. The one or more computer-readable media of claim 15, wherein the instructions further instruct the at least one processor to:
determine the maximum size to prevent timeouts of read operations on the intermediate data storage system.

20. The one or more computer-readable media of claim 15, wherein the size of the data chunks is at least a minimum size that is determined to optimize input/output operations on the intermediate data storage system.

* * * * *